March 5, 1929.  E. A. SPERRY  1,704,489
LOCKING DEVICE FOR GYROSCOPES
Filed June 18, 1924   2 Sheets-Sheet 1
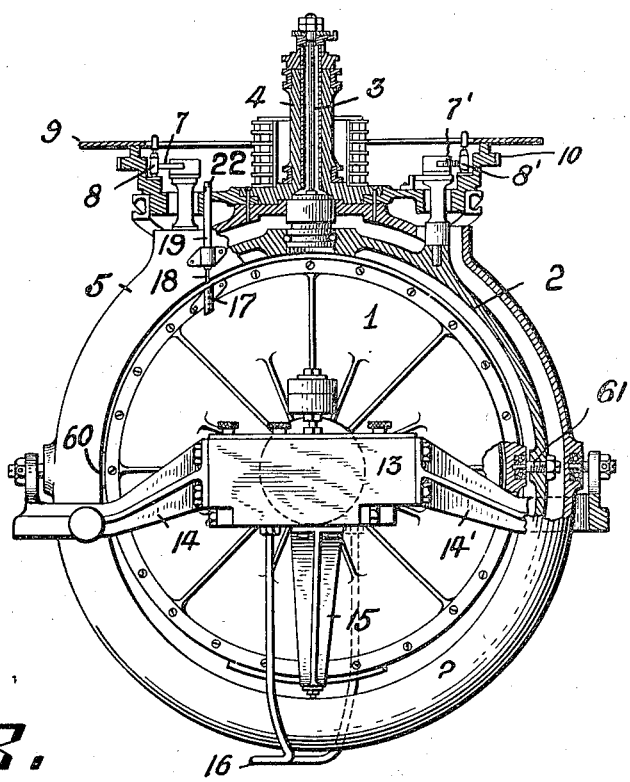
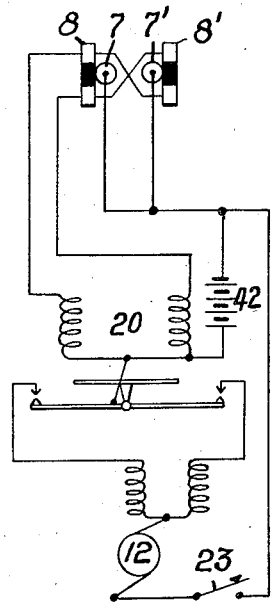
Inventor
ELMER A. SPERRY.
By his Attorney
Herbert H. Thompson March 5, 1929.  E. A. SPERRY  1,704,489
LOCKING DEVICE FOR GYROSCOPES
Filed June 18, 1924  2 Sheets-Sheet 2
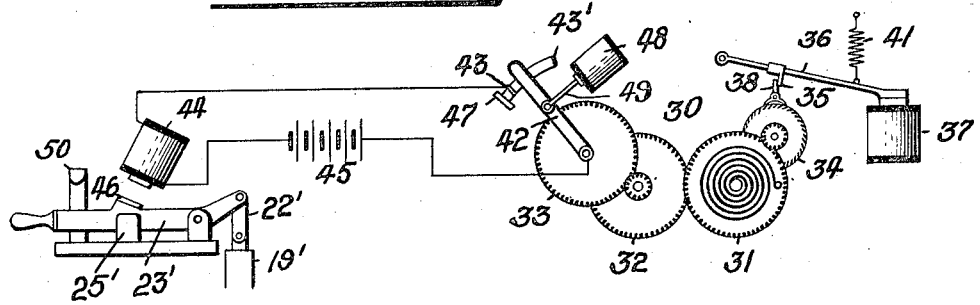
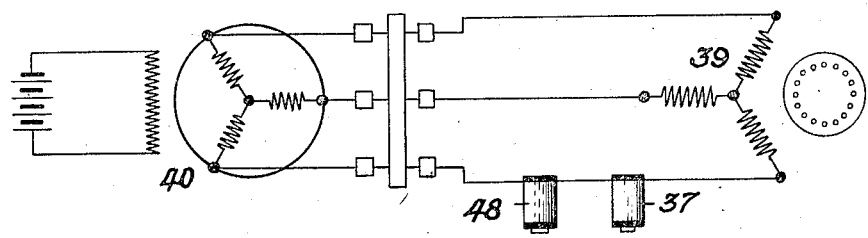
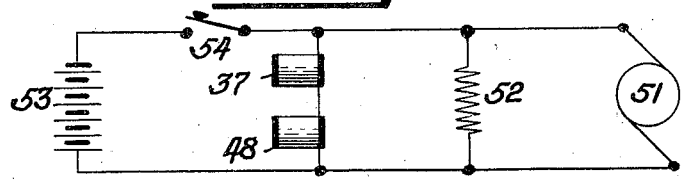
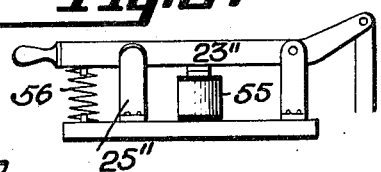
Inventor
ELMER A. SPERRY.
By his Attorney
Herbert H. Thompson Patented Mar. 5, 1929.

1,704,489

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

LOCKING DEVICE FOR GYROSCOPES.

Application filed June 18, 1924. Serial No. 720,753.

This invention relates to gyroscopic navigational apparatus and more especially to that class of gyroscopic compasses which are supported about a horizontal axis in unstable equilibrium so that when not running, the gyroscope proper would tend to turn over unless held upright by extraneous means.

One of the objects of this invention is to provide means for locking the gyro casing against movement about a horizontal axis until the gyro rotor has attained sufficient speed to maintain the casing in a fixed position with relation to said axis. For this purpose I have provided a locking means so connected with a switch for placing into and out of action the parts which control the azimuth motor that when said switch is operated to bring said parts into operation the gyro is unlocked, and conversely, when said parts are placed out of operation said gyro casing is automatically locked against movement about said horizontal axis.

Other objects and advantages will become apparent as the description of the invention is hereinafter developed.

Referring to the drawings wherein I have shown what I now consider to be the preferred forms of my invention:

Fig. 1 is a side elevation, partly in section, of one form of unstable gyroscopic compass with my invention applied thereto.

Fig. 2 is an enlarged sectional detail of the locking means shown in Fig. 1.

Fig. 3 is a diagrammatic view showing an improved form of delayed-action locking means.

Fig. 4 is a wiring diagram showing the wiring of certain magnets shown in Fig. 3.

Fig. 5 is a wiring diagram showing a further modification.

Fig. 6 is a side elevation of another form of switch and locking.

Fig. 7 is a wiring diagram illustrating the action of the form of invention shown in Fig. 6.

Fig. 8 is a wiring diagram showing the connection of the switch associated with the lock in the azimuth motor circuit.

Reference numeral 1 designates the gyro casing which contains the gyro rotor and is mounted in the usual manner for movement about a horizontal axis 60, 61 within the vertical ring 2. Said rotor, casing, and ring constitute, what is generally termed, the sensitive element of the compass. The vertical ring is suspended by one or more wires 3 from the stem 4 of the phantom or follow-up element 5 and is movable about a vertical axis within said phantom. The phantom is in turn supported in the usual manner for movement about a vertical axis within the spider (not shown). The vertical ring 2 carries a pair of trolleys 7, 7' which project through apertures in the phantom and are adapted to engage contact elements 8, 8' carried by said phantom. The phantom element 5 carries the compass card 9 and is also provided with an annular gear 10 adapted to be engaged by a pinion driven by azimuth motor 12 (Fig. 8) in any suitable manner. This structure is also well known in the art and need not be further described here.

The azimuth motor is controlled in the usual manner from the reversing contacts 8, 8' and trolleys 7, 7' through a relay 20', the master switch 23 being placed in the main armature circuit so that when it is opened the follow-up system is dead.

As an unstable type of compass, I have selected a liquid controlled compass of the type shown in the patent to Harrison & Rawlings, #1,362,940 dated December 21, 1920, wherein meridian seeking action of the compass is obtained by a transfer of liquid from one side to another of the gyroscope. In such a compass any tilting about a horizontal axis would cause the rotor to turn over, if the rotor were not running or had not attained sufficient speed to maintain the said casing normally upright. Such action is highly objectional since said casing may be tilted until damage to certain parts of the compass results, or until the mercury spills out. In Fig. 1 wherein a compass of the type aforesaid is shown, the numeral 13 designates a container for the liquid, which container is carried by arms 14, 14' pivoted about a horizontal axis to the phantom 5, and is connected with the gyro casing 1 by means of an arm 15. A pipe 16 connects container 13 with a similar container (not shown) supported in a similar manner on the other side of the gyroscope casing. This structure and the operation thereof is disclosed fully in the patent above referred to and need not be further described here. It will be clear, however, that if the gyro rotor has not reached a sufficient speed of rotation, tilting of the casing 1 about its horizontal axis will result in a flow of liquid from the higher to the lower side of the casing, and this will cause further tilting of said casing so that not only must the casing be restored to its original position but the tilting may bring some part of the connections of the liquid containers into contact with the phantom and damage may result. In order to avoid this and to retain the gyro casing in a fixed position about its horizontal axis until the gyro rotor has been brought up to sufficient speed, I have provided the means shown in the drawings and constructed substantially as follows:

Casing 1 is provided with a socket 17 adapted to receive a slidable pin 18 mounted within a plunger casing 19 which is slidable in a bearing 20 on the phantom. A coiled spring 21 interposed between the head of pin 18 and the top of plunger casing 19 normally presses said pin into the position shown in Fig. 2. The plunger casing 19 is connected at its upper end by a link 22 with a switch 23 pivoted at 24 and adapted to engage a contact 25. While said switch may be placed in the usual transmitter-repeater circuit commonly used with gyro compasses, I have shown it in the azimuth motor circuit as indicated in Fig. 8. As long as switch 23 is open, it will readily be seen that plunger 19 and pin 18 are depressed to lock the casing 1 against tilting. When, however, switch 23 is closed, pin 18 is withdrawn from engagement with socket 17 and the gyro casing is unlocked from the phantom. Since the switch 23 is not closed to throw the azimuth motor circuit into operation until the gyro rotor has been brought to sufficient speed to maintain the gyro casing in a substantially fixed position in azimuth and about the horizontal axis, said gyro casing will remain locked about its horizontal axis until sufficient speed of the gyro rotor is obtained. Also, when the compass is placed out of operation and switch 23 is opened, the casing 1 is automatically locked about its horizontal axis. Spring 21 is provided to permit switch 23 to be opened even though the casing 1 should be tilted so that the aperture or socket 17 is no longer directly beneath pin 18. Socket 17 is shown flared, so that if casing 1 should be tilted slightly about its horizontal axis pin 18 can still engage said socket to both centralize and lock said casing about said axis.

If desired, means may be provided for automatically locking the gyro-casing about its horizontal axis in response to the failure of current in the circuit for driving the gyro-rotor. Since the gyro-rotor possesses great inertia and the gyro-casing is ordinarily exhausted of air, the gyro-rotor may continue rotating for a considerable time at sufficient speed to maintain the gyro-casing in a fixed position, and consequently means may be provided for bringing the aforesaid locking means into action at a predetermined time after the failure of current in the rotor-driving circuit. In Figs. 3 and 4, I have shown one form of means for this purpose, which means may be constructed and arranged substantialy as follows:

A clockwork mechanism 30, comprising series of spring driven gears 31, 32, 33 and escapement wheel 34 is normally held inoperative during the rotation of the gyro-rotor by suitable means such as projection 35 on a pivoted arm 36, which arm is held by an electromagnet 37 in a position such that projection 35 lies in the path of escapement member 38. Magnet 37 should be so connected as to be responsive to the current for driving the gyro-rotor and to that end I have shown said magnet in Fig. 4 in circuit with an induction motor 39 which may be of the usual type employed for turning the rotors of gyroscopes and is shown connected to a polyphase A. C. generator 40. From this construction it will be seen that as soon as the current for driving the gyro-rotor fails, magnet 37 is deenergized and thereupon a spring 41 withdraws stop 35 from the path of escapement member 38 and the clockwork mechanism is released. Driven by said clockwork is an arm 42, frictionally mounted on the shaft of gear wheel 33 for a purpose later to be described, and movable over a segment 43′, of insulating material carrying a contact 43. The parts aforesaid are so arranged that, after magnet 37 is deenergized, arm 42 will not be brought into engagement with contact 43 until a period of time has elapsed sufficient for the gyro to drop below the speed necessary to maintain the gyro casing fixed with respect to its horizontal axis. After such period of time, one hour, for example, has elapsed, said arm 42 and contact 43 are brought into engagement and a circuit is thereby closed through an electromagnet 44. As shown, one terminal of said magnet 44 may be connected to contact 43 and the other terminal to one pole of a source of E. M. F., such as a battery 45, the other pole of which battery is connected to arm 42. Said arm 42 is, of course, suitably insulated from the shaft of gear wheel 33. Energization of magnet 44 attracts switch 23′ which is similar to switch 23 and is provided with a suitable armature 46, and thereby withdraws said switch from engagement with contact 25′ and at the same time moves plunger 19′ to lock the gyro casing against movement about its horizontal axis. After arm 42 has been moved into engagement with contact 43 further movement of said arm may be prevented by a suitable stop 47.

If, while arm 42 is moving toward contact 43, the flow of current in the rotor driving circuit should again be established, said arm 42 may be retracted to its original position, which means may take the form shown in Fig. 3 and comprising an electro-magnet or solenoid 48 in circuit with the rotor driving means and having its core connected through a link 49 with arm 42. As has been previously stated, arm 42 is frictionally mounted on the shaft of gear wheel 33. As long as magnet 48 is deenergized, said arm 42 moves with the shaft of gear wheel 33, but when said magnet 48 is energized, arm 42 is retracted to its original position even though rotation of gear wheel 33 is prevented by the energization of magnet 37 and consequent bringing of stop 35 into the path of escapement member 38. With the construction and arrangement aforesaid it will be evident that should magnet 44 be energized, said magnet will be deenergized whenever current flow in the rotor driving circuit is established. A pair of spring blades 50 may be provided for receiving switch blade 23' when the latter is attracted by magnet 44 and holding said switch blade in its attracted position until removed therefrom by the operator. Otherwise, if said switch blade were returned to engagement with contact 25' immediately after deenergization of magnet 44, the gyro-casing would be unlocked too soon if the said magnet 44 had been energized an appreciable length of time.

Where a shunt motor is used to drive the gyro-rotor, magnets 37 and 48 may be connected across the line as shown in Fig. 5. In the latter figure, 51 designates the armature of a shunt motor for driving the gyro rotor, and 52 the field of said motor. A suitable source of E. M. F., such as a battery 53, is shown electrically connected with said motor. When the circuit from said battery to said motor is broken as by means of a suitable switch 54, the gyro-rotor continues to turn through its own inertia and thereby turns armature 51 and generates current which flows through a local circuit containing field 52 and magnets 37 and 48 as shown. As the speed of the gyro-rotor decreases the current through magnets 37 and 48 likewise decreases, and it is evident that spring 41 may be of such strength as to retract stop 35 from the path of escapement member 38 when the current through magnet 37 drops to a predetermined amount. In this case the clockwork mechanism may obviously be so arranged as to position contact arm 42 in engagement with contact 43 in less time than is the case in Fig. 3, depending on the speed of the gyro-rotor at which the clockwork is released. Upon sufficient current flow being reestablished, magnet 37 will again bring stop 35 into the path of escapement member 38, and magnet 48 will retract arm 42 to its original position.

In Fig. 6 I have shown a switch blade 23'', corresponding to switch blades 23 and 23', adapted to be attracted by a magnet 55 to a position wherein it engages contact 25'' and unlocks the gyro-rotor casing. A spring 56 is adapted, when the current through magnet 55 drops to a predetermined value, to withdraw switch 23'' from engagement with contact 25'' and lock the rotor casing. Magnet 55 may be placed (Fig. 7) in parallel with the shunt motor comprising armature 51' and field 52', a switch 57 being provided for connecting and disconnecting said magnet from the current mains. After the motor aforesaid has been brought up to speed, switch 57 may be closed and magnet 55 will thereupon attract switch blade 23'' to unlock the rotor casing. If, now, the current supply to said motor should fail, spring 56 will move switch blade 23'' to lock the rotor casing when the current in magnet 55 drops to a predetermined amount.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyro compass, the combination with a rotor casing movable about an axis, of electromotive means for driving the rotor of said compass, means whereby said electromotive means may be rendered effective and ineffective, said casing being unstable when said electromotive means is rendered ineffective, and means controlled by the circuit through said driving means for locking said casing against movement about said axis when said electromotive means is rendered ineffective.

2. In a gyro compass, the combination with a rotor casing movable about an axis, of an element with respect to which said casing is movable, a switch mounted on said element for making and breaking the rotor circuit, a plunger slidable on said element and adapted to engage an aperture in said casing, and a connection between said switch and said plunger whereby said plunger is brought into engagement with said aperture when said circuit is broken.

3. In combination with a gyroscope, means for locking said gyroscope against movement about an axis, and means for automatically bringing said locking means into action when the speed of rotation of said gyroscope has decreased to a given amount.

4. In combination with a gyroscope, electrical driving means for driving the rotor of said gyroscope, means for locking said gyroscope against movement about an axis, means for rendering said locking means operative, and a device controlled by the circuit through said driving means whereby said locking means is actuated a predetermined time after the failure of the current through said driving means.

5. In combination with a gyroscope, means for locking said gyroscope against movement about an axis, electrical means for driving the rotor of said gyroscope, and means responsive to the failure of the supply of current to said electrical means for bringing said locking means into action.

6. In a gyroscopic compass, the combination with the gyroscope supported in unstable equilibrium and a spinning motor therefor, of a lock for holding the same upright, when not running, and delayed-action means for automatically causing said lock to operate to prevent tilting of the gyroscope a predetermined interval after the supply of current to said motor is shut off.

In testimony whereof I have affixed my signature.

ELMER A. SPERRY.